(12) United States Patent
Kondo et al.

(10) Patent No.: US 6,717,626 B1
(45) Date of Patent: Apr. 6, 2004

(54) HIGH CONTRAST PROJECTION TELEVISION SHIELD

(75) Inventors: Taiji Kondo, Kyoto-Fu (JP); Yuzo Nakano, Kyoto-fu (JP); Taketoshi Hibi, Kyoto-fu (JP)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 0 days.

(21) Appl. No.: 09/567,871

(22) Filed: May 8, 2000

(51) Int. Cl.[7] .............................. H04N 5/64; H04N 5/72; H04N 5/74
(52) U.S. Cl. ..................... 348/756; 348/786; 348/832; 348/842; 359/456; 359/459; 359/460
(58) Field of Search .................................. 348/756, 779, 348/781, 786, 832, 834, 835, 843; 353/38, 69; 359/454, 455, 456, 459, 460; H04N 5/74

(56) References Cited

U.S. PATENT DOCUMENTS

| | | | | |
|---|---|---|---|---|
| 4,521,524 A | * | 6/1985 | Yamashita | .................... 501/64 |
| 4,741,962 A | * | 5/1988 | Wada et al. | ................ 428/428 |
| 5,010,396 A | | 4/1991 | Hanyu et al. | |
| 5,028,840 A | * | 7/1991 | Uesaka et al. | .............. 313/466 |
| 5,055,922 A | | 10/1991 | Wessling | |
| 5,121,030 A | * | 6/1992 | Schott | ......................... 313/474 |
| 5,296,922 A | * | 3/1994 | Mitani et al. | ................ 348/779 |
| 5,363,149 A | * | 11/1994 | Furuno et al. | .............. 348/789 |
| 5,455,713 A | * | 10/1995 | Kreitzer | ...................... 359/649 |
| 5,559,564 A | * | 9/1996 | Nomura | ...................... 348/779 |
| 5,590,943 A | * | 1/1997 | Yoshida et al. | ................ 353/74 |
| 5,604,403 A | * | 2/1997 | Levy et al. | ...................... 315/8 |
| 5,621,486 A | * | 4/1997 | Doany et al. | ................ 348/756 |
| 5,798,805 A | * | 8/1998 | Ooi et al. | ...................... 349/10 |
| 5,897,981 A | * | 4/1999 | Kobayashi et al. | ............ 430/7 |
| 5,939,821 A | * | 8/1999 | Itou et al. | .................... 313/461 |
| 6,137,547 A | * | 10/2000 | Iijima et al. | ................ 348/789 |
| 6,555,955 B1 | * | 4/2003 | Honda | ......................... 313/489 |

OTHER PUBLICATIONS

Michitaka Ohsawa, et al., "Projection Type Large Screen Display; CRT Projection Display," vol. 45, No. 2, pp. 164–170, 1991 (no translation).

* cited by examiner

*Primary Examiner*—John Miller
*Assistant Examiner*—Brian Yenke
(74) *Attorney, Agent, or Firm*—Orrick, Herrington & Sutcliffe LLP

(57) ABSTRACT

A protection panel is provided that enhances the color quality and/or contrast of a rear projection television set. The protection panel has a spectral transmittance that peaks at dominant wavelengths of red, green, and blue light, and that is reduced at wavelengths between red and green light and between green and blue light. The spectral transmittance at the dominant wavelengths is between sixty and eighty percent. Preferably, the spectral transmittance at the wavelengths between red and green light and between green and blue light are at least five percent less than at the dominant wavelengths. In addition, the spectral transmittance at a dominant wavelength of red light is about five percent less than at a dominant wavelength of blue light to reduce blue color saturation.

19 Claims, 9 Drawing Sheets

HIGH CONTRAST PROJECTION TELEVISION SHIELD

FIELD OF THE INVENTION

The present invention relates generally to projection television sets, particularly to projection television sets having improved optical characteristics, and more particularly to a protection panel for a rear projection television set that has a spectral transmittance that enhances the quality of a color image projected through the protection panel.

BACKGROUND

Projection television sets, particularly rear projection television sets, are a popular alternative to picture tube television sets, as they provide relatively large viewable screens compared to conventional picture tubes. As shown in FIG. 1, a rear projection television set 10 generally includes a cabinet 12 with a set of internal projection tubes 14, a mirror 16, and electronic circuitry (not shown) for receiving broadcast signals and the like, and/or for controlling the projection of an image onto a screen assembly 18 mounted to the front of the cabinet 12.

Turning to FIG. 2, each projection tube 14 includes a cathode ray tube ("CRT") 20, a spacer 22 attached to the CRT 20, and a lens assembly 24 mounted to the spacer 22. The lens assembly 24 includes one or more individual lenses, such as a condenser lens 26 and a "C-lens" 28, mounted in a lens barrel 30, generally with a cooling fluid 34 provided between the CRT 20 and the C-lens 28, as is known in the art. The CRT 20 receives signals from the electronic circuitry that excite a fluorescent substance 32 in the CRT 20 such that the projection tube 14 emits an image (not shown), generally of a single color of light, towards the mirror 16. Generally, a set of three projection tubes 14 are provided (only one shown), each projection tube 14 emitting an image in one of the primary colors, i.e., substantially red, green, and blue light, respectively.

Returning to FIG. 1, the mirror 16 reflects and/or focuses the images (represented generally by ray of light 36) from the projection tubes 14 towards the screen assembly 18. The screen assembly 18 may include a fresnel lens 38 that may further condense the images emitted by the projection tubes 14, and a lenticular screen 40 that may correct and/or control the directional projection of the images, as is known in the art. Finally, an outer protection panel 42 is provided that protects the internal components, such as the lenticular screen 40, and allows the images from the projection tubes 14 to be seen from the front of the cabinet 12.

The fluorescent substances provided in each of the CRT's of a conventional set of projection tubes generate emission spectra that are well known. FIG. 3 shows the relative intensity or luminance of light emitted by a set of commonly used CRT's as a function of the wavelength of the light. For example, a blue CRT generally emits light that corresponds to curve 51, having a peak around a dominant wavelength of about 450 nm. A green CRT generally emits light that corresponds to curve 52, having a dominant wavelength of about 545 nm, and including several sidebands 52A–52D. Finally, a red CRT generally emits light that corresponds to curve 53, having a dominant wavelength of about 610 nm, and including sidebands 53A–53B.

The sidebands 52A–52D, 53A–53B are undesirable emissions generated by the fluorescent materials, and generally reduce the overall color purity of the resulting images that are projected onto the screen assembly 18. To correct for these sidebands, it has been suggested to provide filters in the red and green projection tubes. For example, a color absorbing material may be provided in one of the lenses of the projection tubes, such as the C-lens 28, as is disclosed in U.S. Pat. No. 5,010,396 issued to Hanyu et al. Alternatively, a color absorbing material may be included in the cooling fluid 34 within the projection tube 14, as is disclosed in U.S. Pat. No. 5,055 922 issued to Wessling.

For example, a colored C-lens for a red CRT may provide a filter characteristic such as that shown FIG. 4. The "spectral transmittance" (i.e., the ratio of the intensity of the light exiting from a material as compared to the intensity of the incident light entering the material, as a function of wavelength of the light) for this colored C-lens may provide a transmittance above about 600 nm that is substantially greater than ninety percent (90%),e.g., about ninety two percent (92%). Below 600 nm, however, the transmittance decreases steeply, thereby substantially removing, for example, light from the sideband 53A (shown in FIG. 3), and consequently improving the purity of the red image.

In addition to problems of color purity, rear projection televisions may also experience problems with contrast due to light sources external to the television set. "Contrast" is defined as a ratio of the intensity of light that is received by an observer from a screen displaying one hundred percent (100%) white, and the intensity of light that is received from a screen displaying zero percent (0%) black. If undesired light is seen when the projection television is displaying zero percent (0%) black, it may appear to be brighter than normal black, resulting in a contrast that is lowered and a picture quality that appears to be deteriorated.

For example, as shown in FIG. 5, light from a light source 44 may interfere with the images projected through the protection panel 42, such as from a lamp in the room where the projection television set is located or sunlight from a nearby window. The light source 44 may emit rays of light 46, some of which may be directed towards the screen assembly 18, and be at least partially reflected back towards an observer 48 trying to watch the projection television 10.

An exemplary ray of light 46A from light source 44 is shown that may strike an outside surface 42A of the protection panel 42. As the ray 46A enters and passes through the protection panel 42, first and second reflected rays 46C, 46E may be reflected off of the outside and inside surfaces 42A, 42B of the protection panel 42. In addition, a portion of the ray 46F may leave the protection panel 42 and strike the outside surface 40A of the lenticular screen 40. Although the ray 46F may be diffused by the outside surface 40A of the lenticular screen 40, it may generate a third reflected ray 46G, a portion of which may exit the protection panel 42 as ray 46I and be directed towards the observer 48.

All of these reflected rays 42C, 42E, 42I may interfere substantially with the images being projected by the projection television 10, represented by image ray 36 that passes through the screen assembly 18 towards the observer 48 as ray 36E. For example, a conventional protection panel may reflect about four percent (4%) of incident light striking its surface. Thus, a substantial amount of undesired light (as much as eight percent (8%) or more of the incident light) from a light source 44 may be reflected from the screen assembly towards an observer 48, thereby substantially reducing the contrast of the images being viewed on the protection panel 42.

To reduce the effects of this undesired external light, it has been suggested to add color absorbing material to the protection panel, resulting in what is known as a "dark tint"

protection panel. Such dark tint protection panels generally have a spectral transmittance that is reduced by about twenty percent (20%) as compared to non-tinted protection panels. The spectral transmittance is substantially uniform across all wavelengths, such that the protection panel does not substantially affect the color of the images projected through it. FIG. 6 comparatively illustrates an exemplary spectral transmittance of a nontinted protection panel (line 61) and a dark tint protection panel (line 62). The spectral transmittances shown include a four percent (4%) reduction in intensity of the light passing through the respective panels due to reflection from each of the outside and inside surfaces, as discussed above.

Because of the tinting, any rays that pass through the dark tint protection panel are substantially reduced in intensity. For example, referring again to FIG. 5, because reflected rays 46E and 46I pass through the protection panel twice before being experienced by the observer 48, they may have a relative intensity that is sixty four percent (64%) (0.80× 0.80) that of similar rays passing through a non-tinted protection panel.

Stated differently, the rays have an intensity reduction by twenty percent (20%) each time they pass through the dark tint protection panel before reaching the observer 48.

Dark tint protection panels, however, also reduce the intensity of the light 36 emitted by the projection tubes (e.g., by twenty percent (20%)), and therefore reduce the intensity of the images visible through the protection panel 42. For example, because the ray 36E that reaches the observer 48 passes through the protection panel, it also experiences a twenty percent (20%) reduction in intensity. Because the external light rays 46E, 46I pass through the protection panel 42 twice, however, there is still a net gain in contrast, as compared to a non-tinted protection panel.

To compensate for the loss in intensity of the resulting images projected through a dark tint protection panel (and also due to the loss through the lenticular screen 40, which generally has a spectral transmittance of about seventy percent (70%)); the intensity of the light being emitted by the projection tubes may be increased, e.g., by simply increasing the current to the CRT's. This solution, however, may cause "saturation" of the fluorescent material in one or more of the CRT's, such that any further increase in current does not result in a proportional increase in intensity of the light emitted by the respective saturated CRT. Blue CRT's, in particular, may be susceptible to color saturation, such that increasing the current to the projection tubes too high may result in a loss of blue color in the resulting images, and thereby reducing the overall color quality of the projection television.

Accordingly, it would be desirable to provide a projection television set that has improved color purity and/or contrast.

SUMMARY OF THE INVENTION

The present invention is directed to protection panels for rear projection television sets that enhance the color quality and/or contrast of the television sets. In accordance with one aspect of the present invention, a protection panel is provided that includes a substantially planar member having a spectral transmittance that peaks at dominant wavelengths of substantially red, green, and blue light, and that is reduced substantially at wavelengths between red and green light and between green and blue light. Preferably, the spectral transmittance at a wavelength between red and green light is at least about five percent less than at the dominant wavelengths of substantially red and green light, and/or the spectral transmittance at a wavelength between green and blue light is at least about five percent less than at the dominant wavelengths of substantially green and blue light. More preferably, the spectral transmittance at a dominant wavelength of substantially red light is at least about five percent less than at a dominant wavelength of substantially blue light.

In addition, the protection panel may include an anti-reflection film on one or both surfaces of the planar panel. A frame may be provided that extends around a perimeter of the planar panel. Further, the protection panel may include a connector for detachably mounting the protection panel to a rear projection television set.

In accordance with another aspect of the present invention, a rear projection television set is provided that includes a cabinet having an opening in a front panel thereof communicating with a cavity therein, and a set of projection tubes in the cavity for projecting images towards the opening, each projection tube configured for emitting substantially single color images in one of red, green, and blue light. A screen assembly is mounted across the opening for viewing the images from outside the cabinet. The screen assembly includes a protection panel having a spectral transmittance that peaks at wavelengths of substantially red, green, and blue light, and that is reduced substantially at wavelengths between red and green light and between green and blue light, such as the protection panel described above. A mirror may also be mounted in the cavity in a predetermined relationship with the set of projection tubes such that the images projected from the set of projection tubes are reflected towards the screen assembly.

In addition, the screen assembly may also include a lenticular screen adjacent the protection panel, for example, having a spectral transmittance of at least about eighty percent.

The screen assembly may also include a fresnel lens adjacent the protection panel.

The projection tubes each include a CRT for emitting substantially single color light, and may include a filter, for example, one of the lenses therein may include a color absorbing substance, for filtering one or more undesired sidebands generated by the CRT. For example, a red projection tube may include a lens for filtering the substantially red light emitted by CRT, the lens having a spectral transmittance that substantially absorbs all light below a wavelength of about 600 nm and absorbs at least about ten percent of light at or above a wavelength of about 600 nm.

In a preferred embodiment of the projection television set, the protection screen may be removable from the cabinet. The projection television set may include a user interface for selecting one of an unshielded and a shielded mode indicating whether the protection panel is removed or mounted to the cabinet, respectively. Control circuitry may be coupled to the interface for adjusting current levels of the set of projection tubes in response to the selected mode to provide a predetermined color temperature of an image visible from outside the cabinet through the screen assembly. In one form, where the protection panel has a spectral transmittance at a dominant wavelength of substantially red light that is at least about five percent less than at a dominant wavelength of substantially blue light, the control circuitry may be configured for increasing a color temperature of the set of projection panels when the shielded mode is selected, thereby automatically providing a desired effective color temperature for the images visible through the screen assembly of the projection television set.

In accordance with yet another aspect of the present invention, a rear projection television set is provided that includes a cabinet having an opening in a front panel thereof communicating with a cavity therein, and a set of red, green, and blue projection tubes in the cavity for projecting images towards the opening. Each projection tube is configured for emitting substantially single color images in one of red, green, and blue light, respectively, the red projection tube including a lens having a spectral transmittance of ninety percent or less.

A screen assembly is mounted across the opening for viewing the images from outside the cabinet, the screen assembly including a lenticular screen having a spectral transmittance greater than about seventy percent, and a protection panel having a spectral transmittance that peaks at wavelengths of substantially red, green, and blue light, and that is reduced substantially at wavelengths between red and green light and between green blue light.

Because the protection panel has a relatively high transmittance around the red, green, and blue wavelengths, while attenuating the light intermediate to the dominant wavelengths, the protection panel may substantially enhance the color quality of images observed on the projection television set. In addition, where the protection panel has a transmittance that is greater for blue light than for red light, the protection panel may also reduce the risk of color saturation of the blue projection tube, thereby increasing the color purity at increased brightness levels.

Other objects and features of the present invention will, become apparent from consideration of the following description taken in conjunction with the accompanying drawings.

DETAILED DESCRIPTION OF THE PREFERRED EMBODIMENTS

Figure 7:
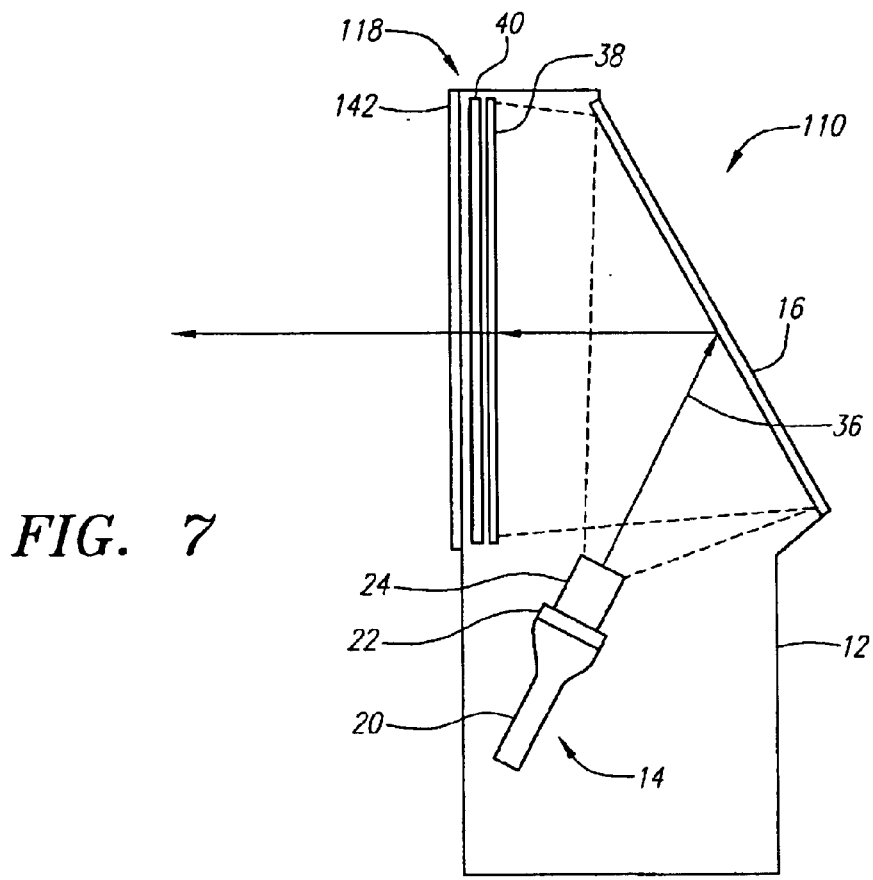
FIG. 7 is a cross-sectional side view of a first preferred embodiment of a rear projection television set, in accordance with the present invention.

Turning now to the drawings, FIG. 7 shows a first preferred embodiment of a rear projection television set 110, in accordance with the present invention. The television set 110 generally includes a cabinet 12 containing a set of internal projection tubes 14, a mirror 16, and electronic circuitry (not shown), similar to the conventional projection television set 10 described above. Like reference numbers are used to indicate components that are similar to the conventional projection television set 10 described above, while reference numbers increased by one hundred (100) indicate components incorporating features of the present invention.

The projection tubes 14 receive signals from the electronic circuitry that excite a fluorescent substance such that the projection tubes 14 each emit an image, generally of a single color of light, towards the mirror 16. Preferably, a set of three projection tubes 14 is provided (only one shown), each projection tube 14 emitting light images in one of the primary colors, i.e., substantially red, green, and blue light, respectively. The mirror 16, in turn, reflects and/or focuses the images (represented generally by ray of light 36) from the projection tubes 14 towards a screen assembly 118. The screen assembly 118 may include a fresnel lens 38 that may further condense the light emitted by the projection tubes 14, and a lenticular screen 40 that may correct and/or control the directional projection of the images, as is known in the art.

An outer protection panel 142 is provided that protects the internal components, such as the lenticular screen 40, and allows the images from the projection tubes 14 to be seen from the front of the cabinet 12. The protection panel 142 is substantially transparent, and may be formed from a variety of materials, such as plastic, preferably polymethyl methacrylate (PMMA) or polycarbonate, or glass, and may be formed by any known method, such as injection molding. One or more color absorbing substances, e.g., organic pigments or dyes, are added to the panel material to provide a predetermined spectral transmittance through the protection panel 142.

Kuraray of Japan is a preferred source for plastic planar panels appropriate for use as protection panels in accordance with the present invention. Because of its proprietary nature, no additional information is available on the color absorbing substances used to make the projection panel, nor on the methods of manufacturing the protection panels in accordance with the present invention.

Figure 9:
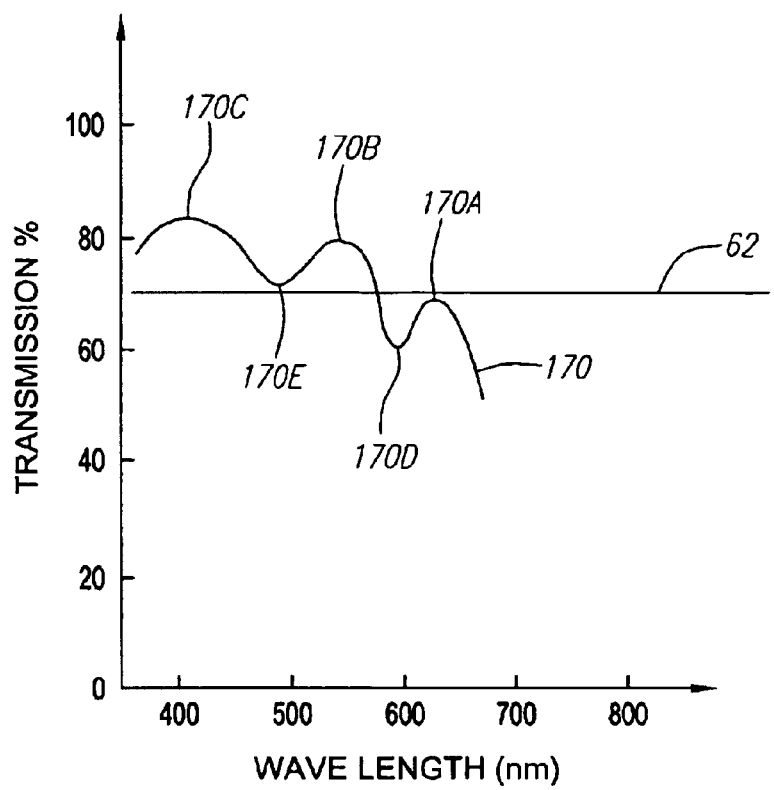
FIG. 9 is a graph showing the spectral transmittance of a protection panel for the projection television set of FIG. 7, in accordance with the present invention.

Turning to FIG. 9, the protection panel 142 preferably has a spectral transmittance as indicated by curve 170 that peaks at dominant wavelengths 170A, 170B, 170C of substantially red light (about 610 nm), green light (about 545 nm), and blue light (about 450 nm), respectively, and that is substantially lower at wavelengths between red and green light 170D and between green and blue light 170E. The spectral transmittance at the dominant wavelengths of 'substantially red, green, and blue light may be at least about sixty percent (60%), preferably at least about seventy percent (70%), and more preferably less than about ninety percent (90%). The spectral transmittance at the dominant wavelength 170A of the substantially red light may be at least about five percent (5%) less than at the dominant wavelength 170C of the substantially blue light, and preferably at least about ten percent (10%) less.

Thus, the relative intensity of blue light passing through the protection panel 142 may be substantially greater than the intensity of red light. Stated differently, if the set of projection tubes are driven at current levels to generate an overall white image on an inside surface 142B of the projection panel 142, the resulting image visible from the-outside surface 142A of the protection panel 142 may experience a blue shift, or relative increase in intensity of blue light as compared to red light in the resulting image. This feature may be important to reduce the risk of color saturation and its impact on color quality of the resulting images, as explained further below.

At wavelengths 170D between red and green light, the spectral transmittance is at least about five percent less than at the dominant wavelengths 170A, 170B of the substantially red and green light. Similarly, the spectral transmittance at the wavelengths 170E between green and blue light is at least about five percent less than at the dominant wavelengths 170B, 170C of the substantially green and blue light, as shown.

Figure 1:
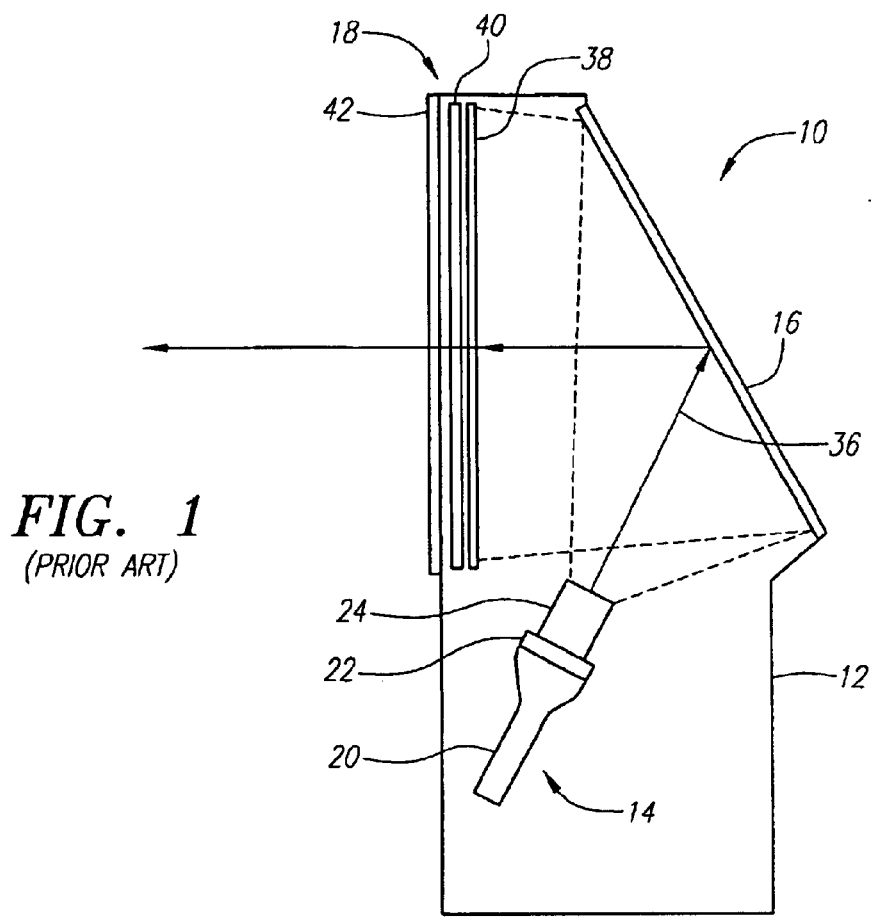
FIG. 1 is a cross-sectional side view of a conventional rear projection television set.
Figure 2:
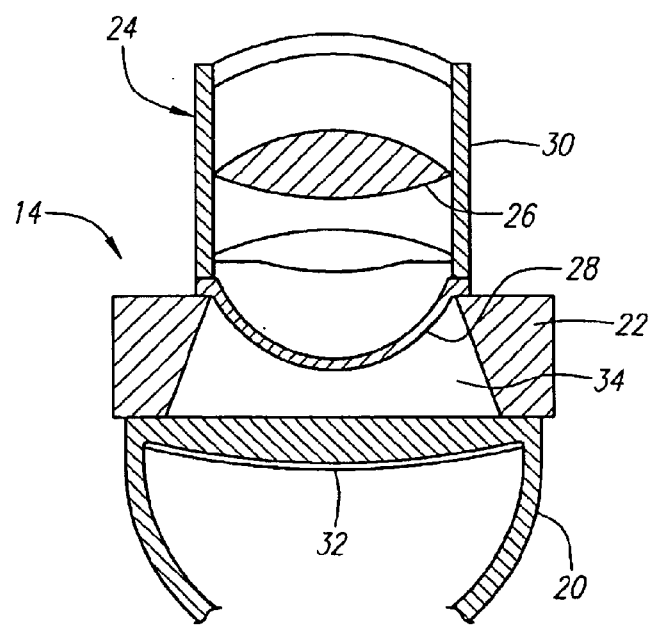
FIG. 2 is a cross-sectional detail of a projection tube for a rear projection television set, such as that shown in FIG. 1.
Figure 3:
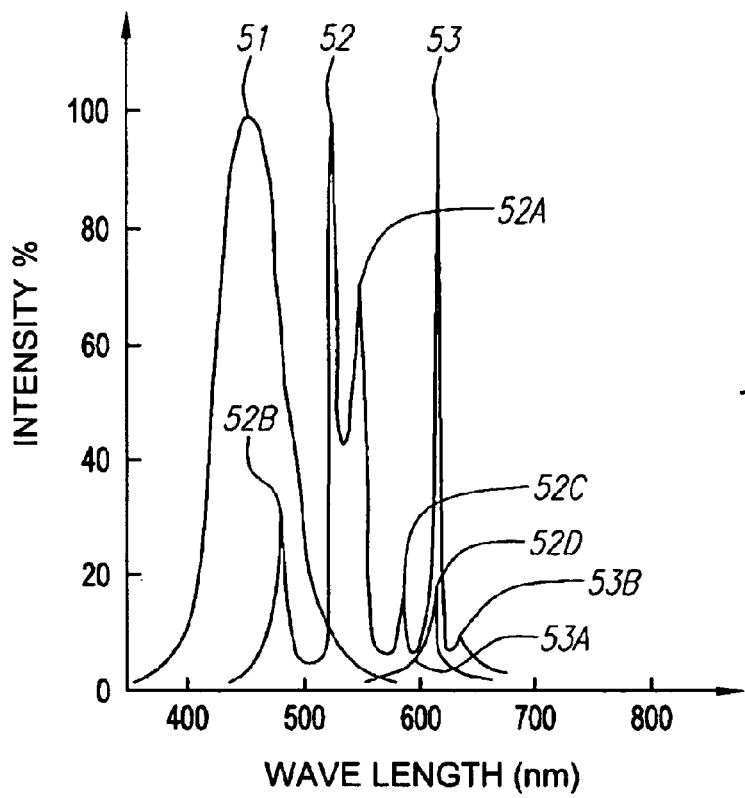
FIG. 3 is a graph showing the emission spectra for a conventional set of projection tubes, including a red, a green, and a blue CRT.
Figure 4:
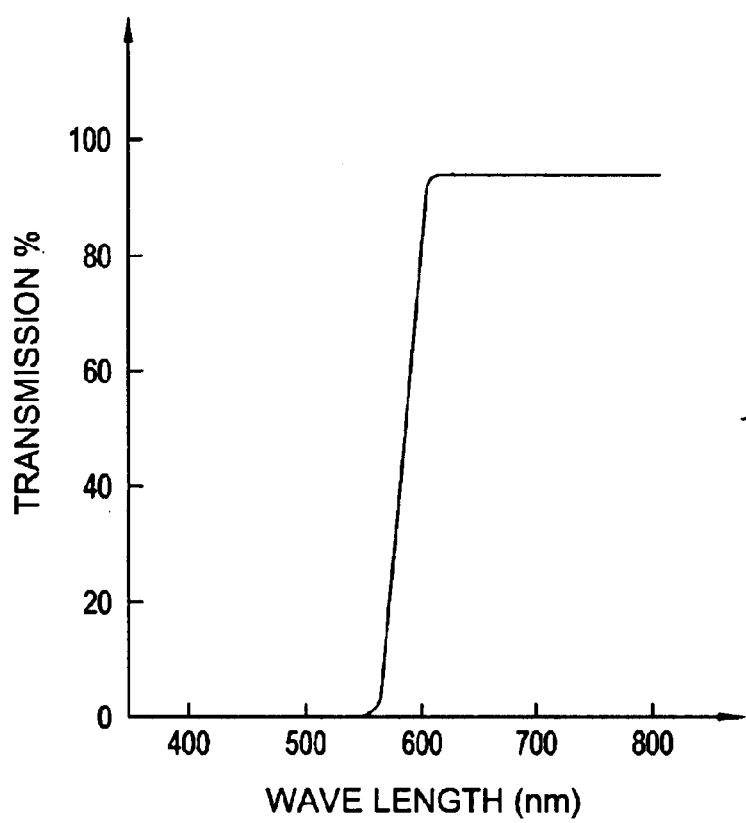
FIG. 4 is a graph showing the spectral transmittance of a conventional red C-lens, such as that shown in FIG. 2.
Figure 5:
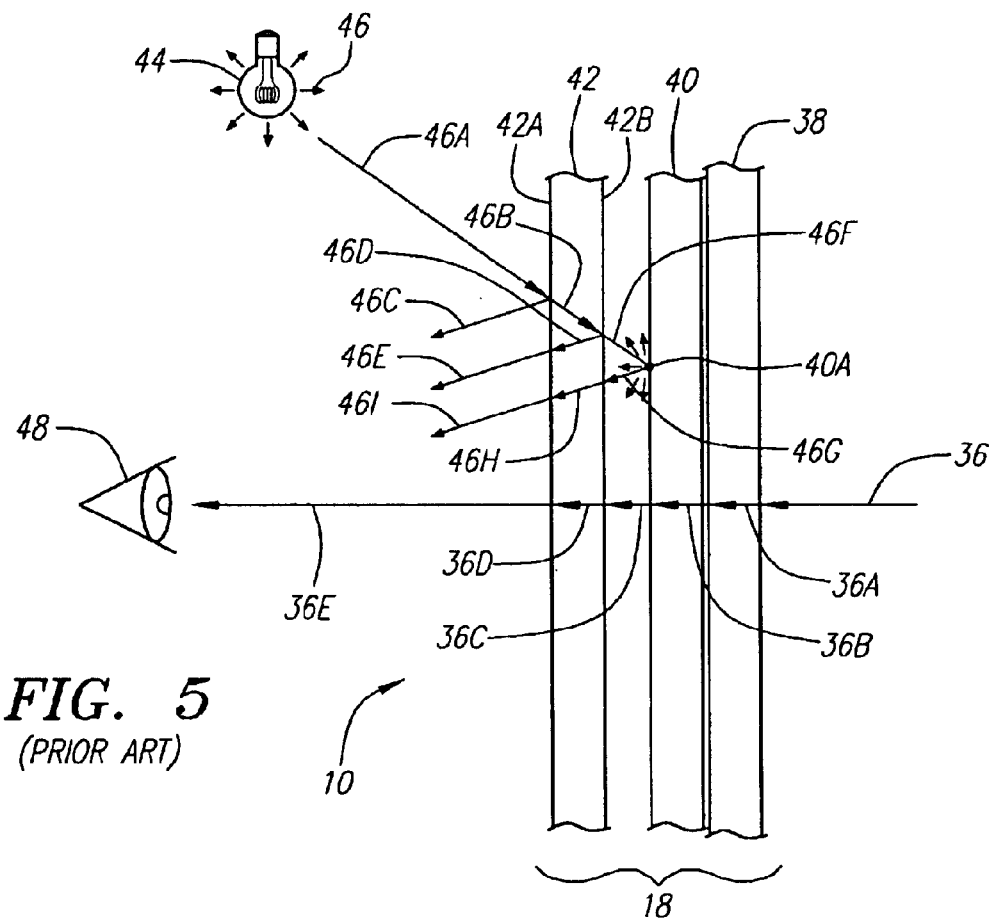
FIG. 5 is a detail of the projection television set of FIG. 1, showing representative rays of light that may be experienced by an observer watching the projection television set.
Figure 6:
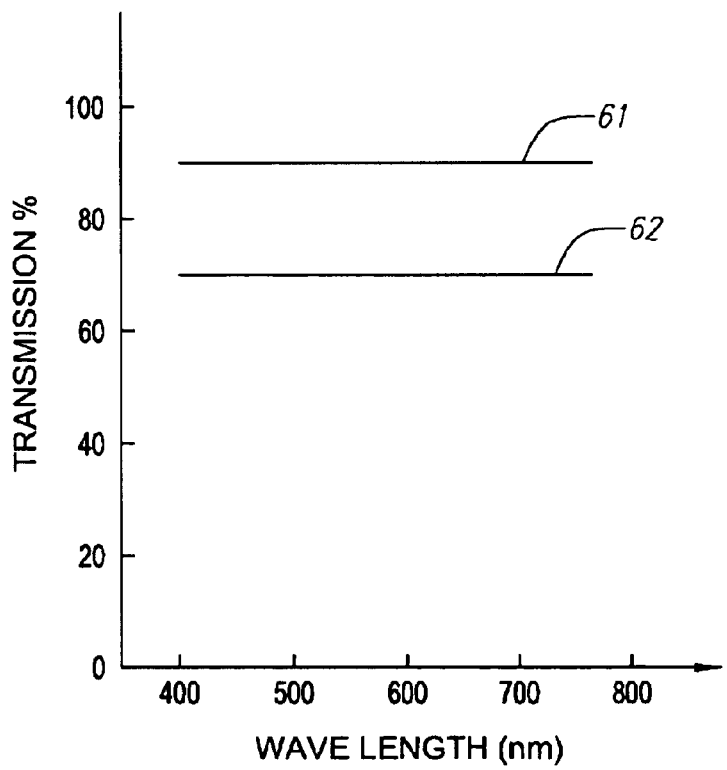
FIG. 6 is a graph showing the spectral transmittance of a non-tinted and a dark tint protection panel.

Thus, the protection panel 142 has a relatively high transmittance around the red, green, and blue wavelengths, while attenuating the light intermediate to the dominant wavelengths. This property of the protection panel 142 may substantially enhance the color quality of images observed on the projection television set 110. Any light generated by the projection tubes that is substantially off from the dominant wavelengths, such as the sidebands 52A–52D, 53A–52B (not shown in FIG. 9; see FIG. 3), may deteriorate the color purity of the respective single color images, and consequently deteriorate the overall color purity of the resulting images visible through the protection panel 142. The spectral transmittance of a protection panel 142 in accordance with the present invention substantially reduces this deterioration, as will be appreciated by those skilled in the art.

For comparison, the uniform spectral transmittance of a dark tint protection panel, such as that described above, is shown in FIG. 9 by curve 62. As may be seen, the transmittance of blue and green light is substantially increased for the protection panel 142 according to the present invention as compared with the dark tint protection panel, while the transmittance of red light is about the same. Further, the transmittance of the intermediate regions is the same or less with the protection panel 142 as compared with the dark tint protection panel. Thus, the protection panel 142 may provide a spectral transmittance that enhances transmission of the desired dominant color wavelengths through it, thereby providing an improved color purity in the resulting images.

Figure 10:
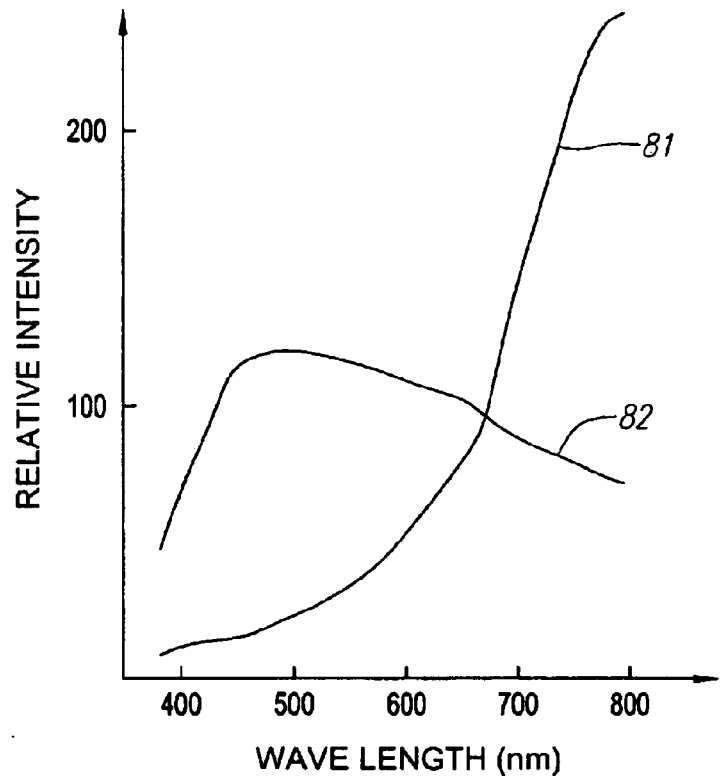
FIG. 10 is a graph showing the spectral transmittance of exemplary external light sources, namely an incandescent lamp and sunlight.

In addition, the spectral transmittance of a protection panel 142 according to the present invention may also substantially reduce the impact of external sources of light on the images projected through the protection panel 142. For example, FIG. 10 shows an exemplary spectral luminance or brightness spectrum of an incandescent lamp (curve 81) and of sunlight (curve 82) to which a projection television set may be exposed. As may be seen, an incandescent lamp emits light between wavelengths of about 380–780 nm, with increased intensity in the range of red light, i.e., above 600 nm.

Figure 8:
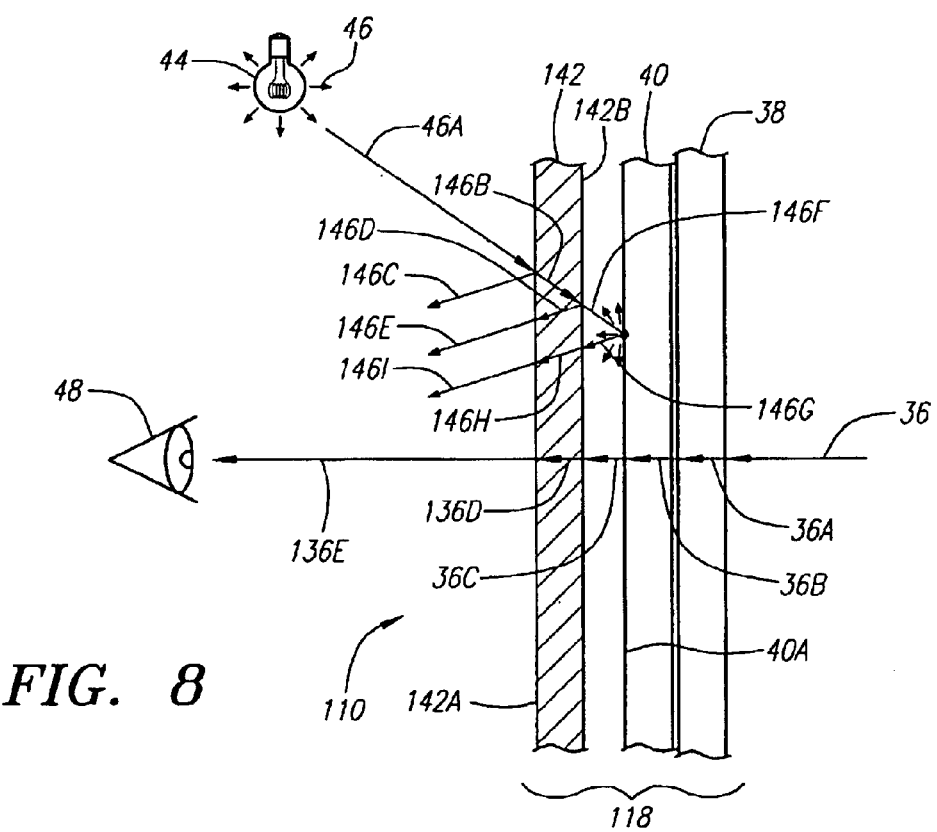
FIG. 8 is a detail of the projection television set of FIG. 7, showing representative rays of light that may be experienced by an observer watching the projection television set.

Turning to FIG. 8, if light source 44 is an incandescent lamp, it may emit an exemplary ray of light 46A towards the protection panel 142, as shown. Because the transmittance through the protection panel 142 of red light is relatively low compared to that of green and blue light, the intensity of reflected rays 146E, 146I originating from the incandescent lamp may be substantially decreased within the range of red light, thereby reducing the impact of the light source 44 on the images visible through the protection panel 142. For example, where the transmittance of red light through the protection panel 142 is about seventy percent (70%), the red light in the incandescent lamp may be reduced to less than fifty percent (50%) (0.70×0.70) as compared to a non-tinted protection panel. Thus, in the red wavelength range, the reflected ray 146E may have an intensity of less than two percent (2%) of the incident ray 46A (0.96×0.70×0.04× 0.70).

With respect to the images (represented by ray 36) emitted by the projection tubes (not shown), the transmittance is relatively high for the blue and green light in the images, while the transmittance is about the same for the red light, as compared to a dark tint protection panel. For the exemplary red transmittance given above, the intensity of red light from the ray 36E is reduced to about seventy percent (70%) of the incident ray 36, as compared to the fifty percent (50%) intensity reduction for the light source 44. Thus, the relative intensity or brightness of the images may be improved, and the adverse effect of the incandescent lamp may be substantially reduced.

The spectral transmittance of a protection panel according to the present invention may also reduce the risk of color saturation that may adversely affect the color purity of images projected through the protection panel. For example, with conventional CRT's, the fluorescent material in a blue CRT has a tendency to saturate when the current is increased, thereby preventing further increase in the intensity of the blue color generated by the CRT's. Thus, at increased brightness levels, the color purity of the resulting images of a projection television may lose some of their blue color.

With a protection panel in accordance with the present invention, however, the transmittance of blue light is substantially higher than the transmittance of red light through the protection panel 142. Thus, the resulting images visible through the protection panel may have a relatively brighter intensity of blue light than green and/or red light when the CRT's are excited at similar current levels. To provide a resulting image that is substantially balanced, the blue projection tube may be operated at a lower relative current level than the green and/or red projection tubes, i.e., the set of projection tubes may be operated at a higher color temperature, as described further below. Thus, the overall brightness of the resulting images visible through the protection panel 142 may be increased with a reduced risk of saturating the blue CRT.

Figure 17:
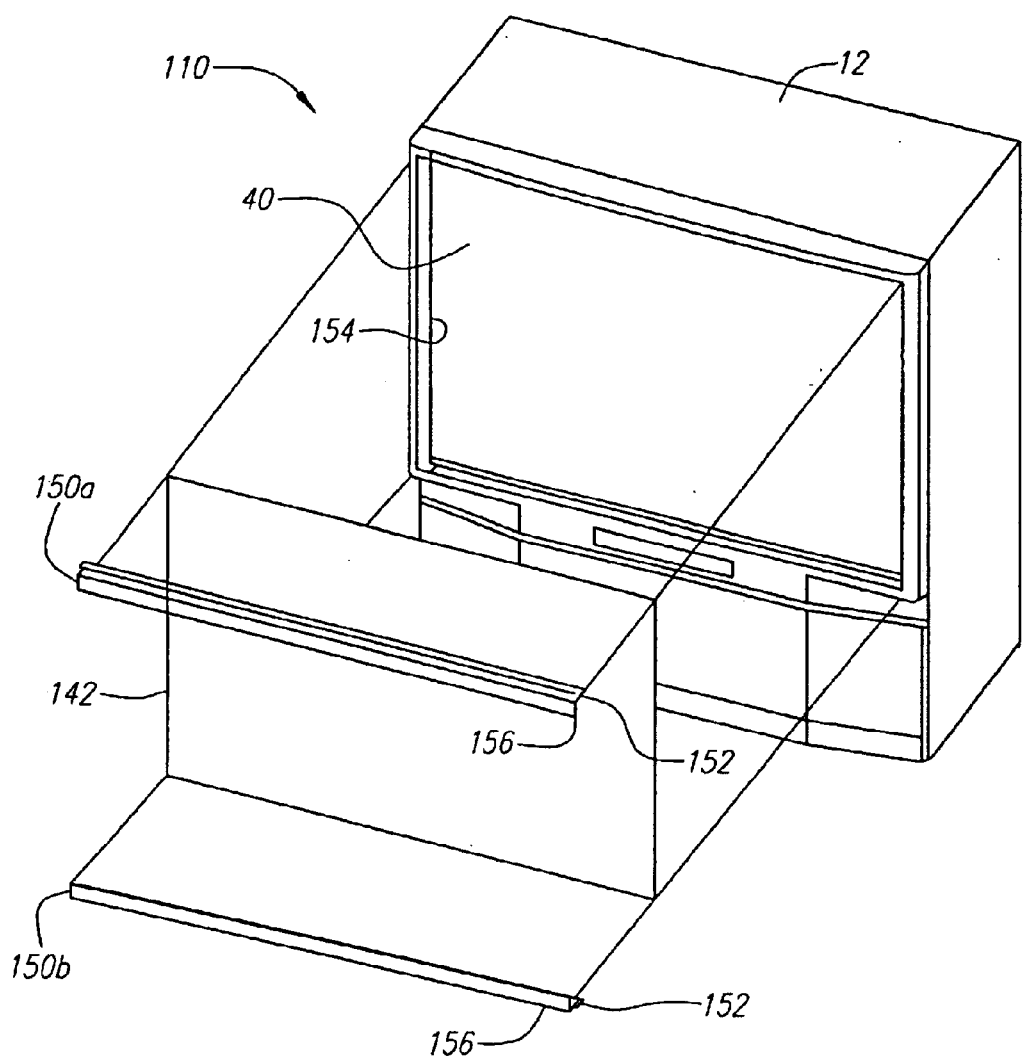
FIG. 17 is an exploded perspective view of a television set including a removable protection panel.

Turning to FIG. 17, the protection panel 142 is preferably detachably mountable to the cabinet 12. For example, the protection panel 142 may be mountable to the cabinet 12 using one or more frame members, such as upper and lower frame members 150a, 150b. The exemplary frame members 150 shown each include a hemmed portion 152 that may be received in a mating pocket or slot (not shown) in the cabinet 12 along opening 154, and a flange portion 156 for holding the protection panel 142 against the cabinet 12. Alternatively, the protection panel 142 may include a frame (not shown) around all or a portion if its perimeter that may be integrally molded or attached to the protection panel 142. A plurality of connectors, such as cooperating flanges and pockets, fasteners, and the like (not shown), may be provided on the frame, elsewhere on the protection panel 142, and/or on the cabinet 12 to facilitate mounting across the opening 154 in front of the lenticular screen 40.

Thus, it may be possible to operate the projection television set 110 in two modes, an unshielded mode without the protection panel 142, and a shielded mode with the protection panel 142 attached to the front of the cabinet 12. For example, when external sources of undesired light are present, it may be desirable to mount the protection panel 142 to the front of the projection television 110. Otherwise, the protection panel 142 may be removed. The projection television set may be initially provided with a removable protection panel, e.g., at time of purchase, or the protection panel may be provided as a separate accessory, e.g. that may be purchased for mounting to an existing projection television set. In a further alternative, the protection panel 142 may be substantially permanently mounted to the cabinet 12 if this modular feature is not desired.

Because use of the protection panel 142 affects the color characteristics of the resulting images visible through the protection panel 142, a projection television set in accordance with the present invention may include a system for automatically changing its mode of operation. The system may allow a user to change the mode of the projection television set 110 or otherwise correct for the color characteristics based upon whether the protection panel 142 is attached or removed from the cabinet 12.

Figure 11:
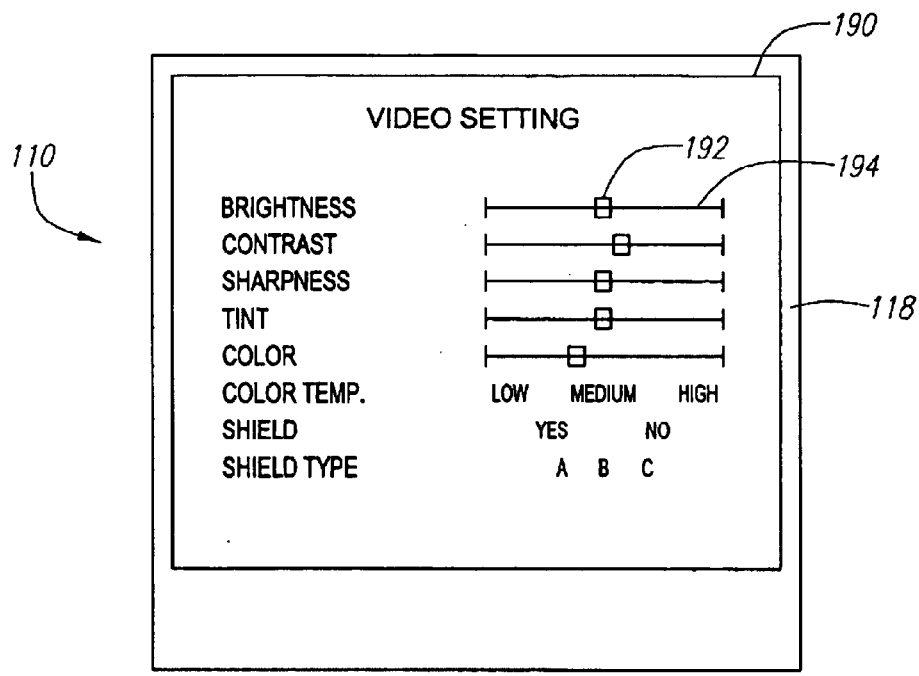
FIG. 11 is a front view of a control panel display for setting several parameters of images generated by a projection television set, in accordance with the present invention.

FIG. 11 shows a control panel 190 that may be displayed on the screen assembly 118 (not shown in FIG. 11) to control the operation of the projection television set 110. The control panel 190 includes a number of parameters that may be controlled, such as Brightness, Contrast, Sharpness, Tint, Color, and Color Temperature, as is known in the art. By operating a remote control (not shown) that communicates with the electronic circuitry of the projection television 110, the operation of the projection tubes and/or other circuitry (not shown) within the projection television set 110 may be controlled to adjust one or more of these parameters. For example, the remote control may include a button to activate and display the control panel 190, and a set of directional or menu buttons to toggle between the parameters and/or to modify a particular parameter, e.g., using a slider 192 on a linear scale 194, as shown. Alternatively, other user interfaces may be provided, such as a panel of buttons on the face of the cabinet (not shown), that allow the user to activate the control panel 190 and/or adjust the displayed parameters.

For example, to adjust the brightness of the images projected onto the screen assembly 118, the "Brightness" parameter may be selected on the control panel 190, and then the associated slider 192 may be moved right or left on the scale 194 to increase or decrease the intensity of the light projected onto the screen assembly 118. In response to the command, circuitry within the projection television set 110 may adjust the current levels of the projection tubes to increase or decrease their output and intensity level accordingly.

More particularly, the control panel 190 may facilitate switching the mode of the projection television set 110 between an unshielded mode and a shielded mode. When the protection panel is not mounted to the projection television set 110, a "Shield" parameter may be activated and "No" selected to operate in the unshielded mode. The color temperature may then default to "Medium" and/or may be manually set at one of the options, e.g., "Low," "Medium," or "High." For example, at the "Medium" setting, the color mix of red, green, and blue light included in an effective "white" image may be set at a color temperature of about 6500 degrees Kelvin, as will be appreciated by those skilled in the art. If it is desired to "warm" or "cool" the white image, i.e., add more red or blue to the white image, respectively, the color temperature may then be set to "High" or "Low," respectively.

When a protection panel is mounted to the projection television set 110, the "Shield" parameter may be activated and "Yes" selected to switch operation to the shielded mode. The control panel 190 may then toggle to the "Shield Type" parameter, and require entry of one of the selections, e.g., "A," "B," or "C," to identify the protection panel being used. For example, if the protection panel 142 described above were identified as an "A" type shield, "A" may be selected. In response to this selection, the electronic circuitry of the projection television set 110 may automatically adjust the color temperature by changing the respective gain or current level to each of the set of projection tubes to provide a predetermined color temperature for white images visible through the protection panel.

For example, because the protection panel 142 described above has a spectral transmittance that is substantially lower for red light than for blue light, the color temperature may be increased by about 1300 degrees Kelvin. The current to the green and red CRT's may remain the same or may be increased slightly, and the current to the blue CRT reduced, for example, by about 8.4 percent. This substantially increases the relative amount of red light in the white image to compensate for the reduced transmittance of red light through the protection panel, and thereby provide an effective color temperature of white images visible through the protection panel that may remain at a desired level, e.g., about 6500 degrees Kelvin.

The control panel 190 and automated system may also facilitate initially configuring the projection television set 110, for example, during its manufacture. Without the protection panel in place, a "white" image may be projected and the mix of red, green, and blue light corrected, i.e., by adjusting the gain or current level of each of the CRT's, to provide a predetermined color temperature. The values of the gain for each of the CRT's at the predetermined color temperature may then be stored in memory coupled to the electronic circuitry of the projection television set 110, and associated with the unshielded mode.

A protection panel may then be provided, and the "white" image projected therethrough. The respective gain of each of the CRT's may then be adjusted until the "white" image visible through the protection panel corresponds substantially to the predetermined color temperature. The values of the gain may then be stored in the memory and associated with the shielded mode, e.g., Shield Type "A." Thus, a processor or other circuitry coupled to the memory may subsequently access these gain values based upon the selected mode, and set the CRT's accordingly.

Figure 12:
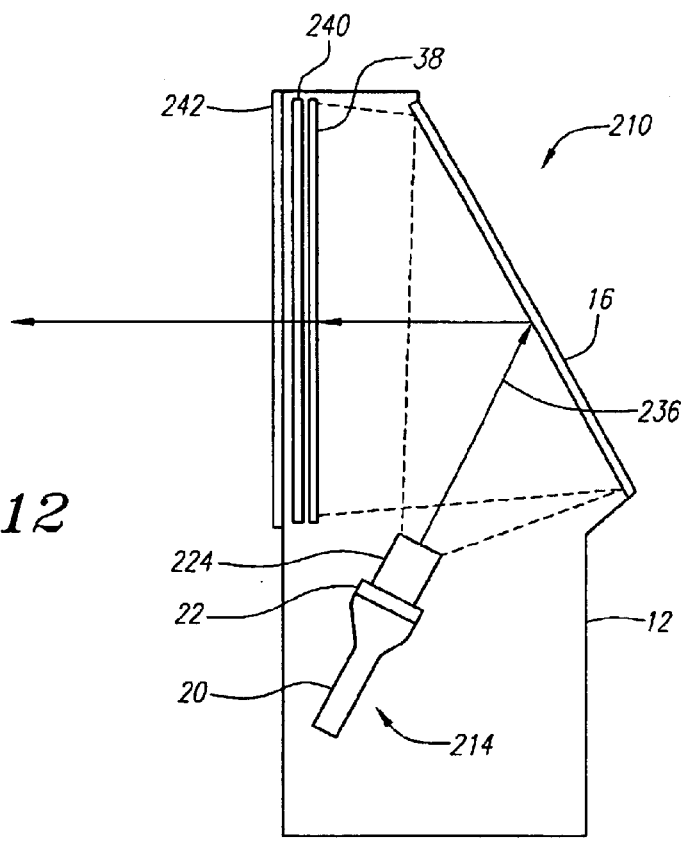
FIG. 12 is a cross-sectional side view of a second preferred embodiment of a rear projection television set, in accordance with the present invention.

Turning to FIG. 12, a second preferred embodiment of a rear projection television set 210 is shown that generally includes a cabinet 12 containing a set of projection tubes 214, a mirror 16, a screen assembly 218, and electronic circuitry (not shown), similar to the first preferred embodiment described above. Like reference numbers are used to indicate components that are similar to the conventional projection television set 10 described above, while reference numbers increased by two hundred (200) indicate components incorporating features of the present invention.

Figure 13:
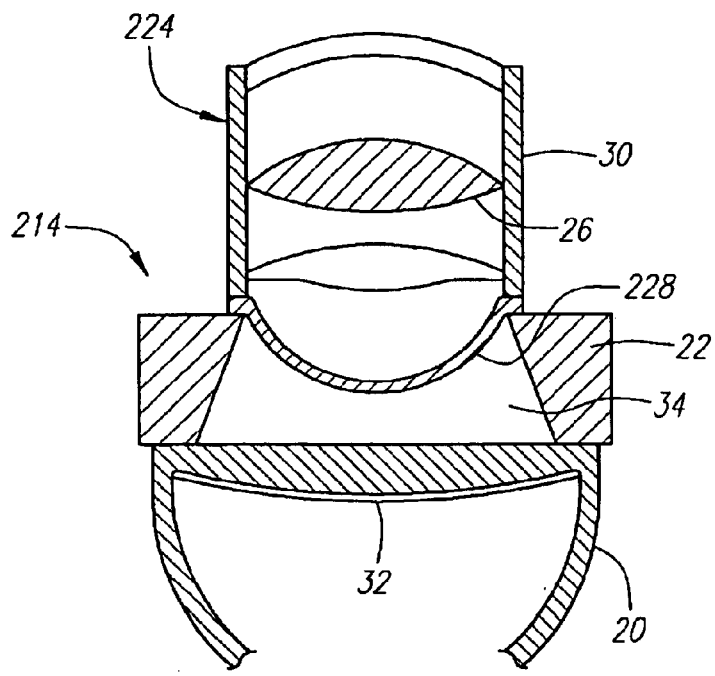
FIG. 13 is a cross-sectional detail of a projection tube for the rear projection television set of FIG. 12.

Turning to FIG. 13, each projection tube 214 includes a cathode ray tube ("CRT") 20, a spacer 22 attached to the CRT 20, and a lens assembly 224 mounted to the spacer 22. The lens assembly 224 includes a plurality of individual lenses, preferably including a condenser lens 26 and a "C-lens" 228, mounted in a lens barrel 30, generally with a cooling fluid 34 provided between the CRT 20 and the C-lens 228. Preferably, a set of three projection tubes 214 are provided (only one shown), each projection tube 14 emitting an image in one of the primary colors, i.e., substantially red, green, and blue light, respectively, as described above.

Figure 15:
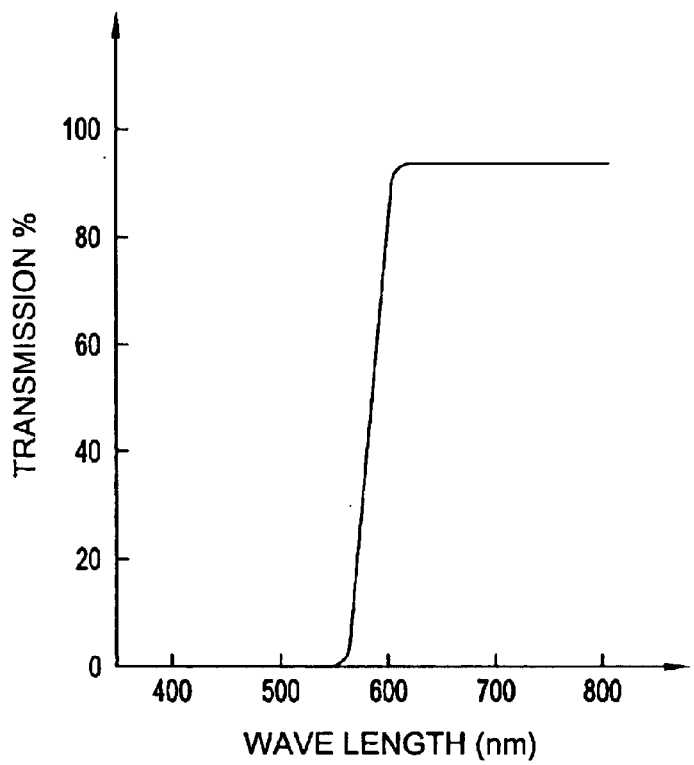
FIG. 15 is a graph showing the spectral transmittance of a red C-lens for the projection tube of FIG. 13.

Unlike the first preferred embodiment, the red projection tube 214 has a C-lens 228 that includes a color absorbing substance therein that has a spectral transmittance that filters wavelengths of light that are substantially below red light. For example, a predetermined density of colored dye may be included in the C-lens material when it is formed. As shown in FIG. 15, the C-lens 228 preferably has a spectral transmittance that substantially absorbs all light below a wavelength of about 600 nm and absorbs at least about ten percent (10%) of light at or above a wavelength of about 600 nm, i.e., has a transmittance of ninety percent or less at or above 600 nm. More preferably, the C-lens 228 has a transmittance at or above a wavelength of about 600 nm of about eighty two percent (82%).

Alternatively, the color absorbing substance may be provided in one of the other lenses within the red projection tube 214 (not shown). Additional information on including color absorbing substances in lenses and projection tubes may be found in U.S. Pat. No. 5,010,396 issued to Hanyu et al., the disclosure of which is expressly incorporated herein by reference. Alternatively, a color absorbing substance may be included in the cooling fluid 34 of the red projection tube 214, as is disclosed in U.S. Pat. No. 5,055,1922 issued to Wessling, the disclosure of which is also expressly incorporated herein by reference.

Returning to FIG. 12, the screen assembly 218 includes a fresnel lens 38 that may further condense the light emitted by the projection tubes 214, and a lenticular screen 240 that may correct and/or control the directional projection of the images. The lenticular screen 240 preferably has a spectral transmittance substantially greater than seventy percent (70%), and more preferably at least about eighty percent (80%). The spectral transmittance of the lenticular screen 240 is generally wavelength independent, i.e., substantially constant at any wavelength of light passing through it.

An outer protection panel 242 is provided that allows the images from the projection tubes 214 to be seen from the front of the cabinet 12. Similar to the previously described protection panel 142 (shown in FIG. 7), the protection panel 242 is generally formed from materials, such as polymethyl methacrylate (PMMA), polycarbonate, or other plastics, that include one or more color absorbing substances added to the panel material to provide a predetermined spectral transmittance through the protection panel 242.

In addition, anti-reflection films 241, 243 may be provided on the inside and outside surfaces 242B, 242A of the protection panel 242. Preferably, the films 241, 243 substantially reduce the intensity of light that is reflected off of the respective surfaces 242B, 242A to about one percent (1%) or less, and more preferably to about one half percent (0.5%) or less. Alternatively, one or both anti-reflection films 241, 243 may be it eliminated or similar films may be provide on the previously described protection panel 142 (not shown). In a further alternative, other finishes may be provided on, e.g., molded directly into, the outside and/or inside surfaces 242A, 242B to create an anti-reflection finish, as is known to those skilled in the art.

Figure 16:
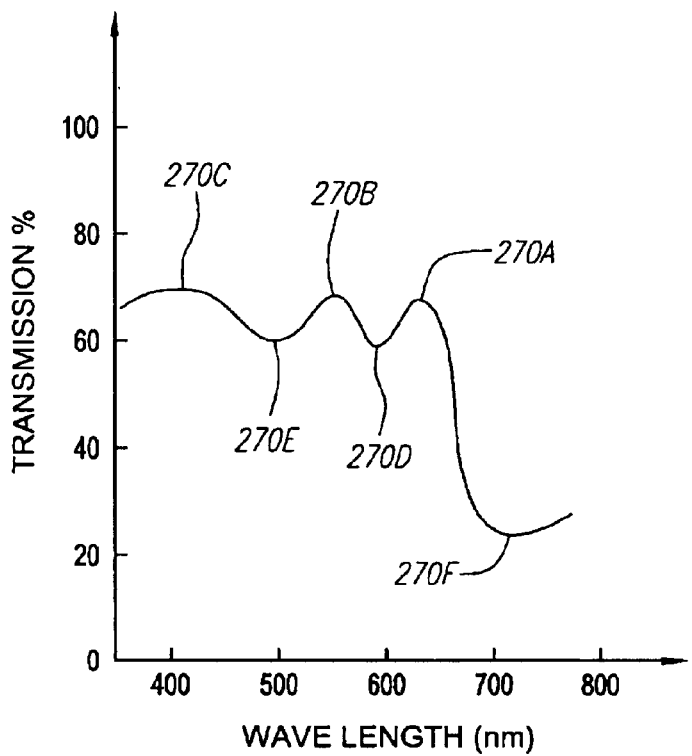
FIG. 16 is a graph showing the spectral transmittance of a protection panel for the projection television set of FIG. 12, in accordance with the present invention.

Preferably, the protection panel 242 has a spectral transmittance as indicated by curve 270 in FIG. 16 that peaks at dominant wavelengths 270A, 27DB, 270C of substantially red light (about 610 nm), green light (about 545 nm), and blue light (about 450 nm), respectively, and that is substantially lower at wavelengths between red and green light 270D and between green and blue light 270E. The spectral transmittance at the dominant wavelengths of substantially red, green, and blue light may be at least about sixty percent (60%), preferably less than about eighty percent (80%), and more preferably about seventy percent (70%).

At wavelengths 270D between red and green light, the spectral transmittance dips to at least about five percent less than at the dominant wavelengths 270A, 270B of the substantially red and green light. Similarly, the spectral transmittance at the wavelengths 270E between green and blue light dips to at least about five percent less than at the dominant wavelengths 270B, 270C of the substantially green and blue light, as shown. Thus, the protection panel 142 has a relatively high transmittance around the red, green, and blue wavelengths, while attenuating the light intermediate to the dominant wavelengths. This property of the protection panel 142 may substantially enhance the color quality of images observed on the projection television 110, similar to the previously described embodiment.

Figure 14:
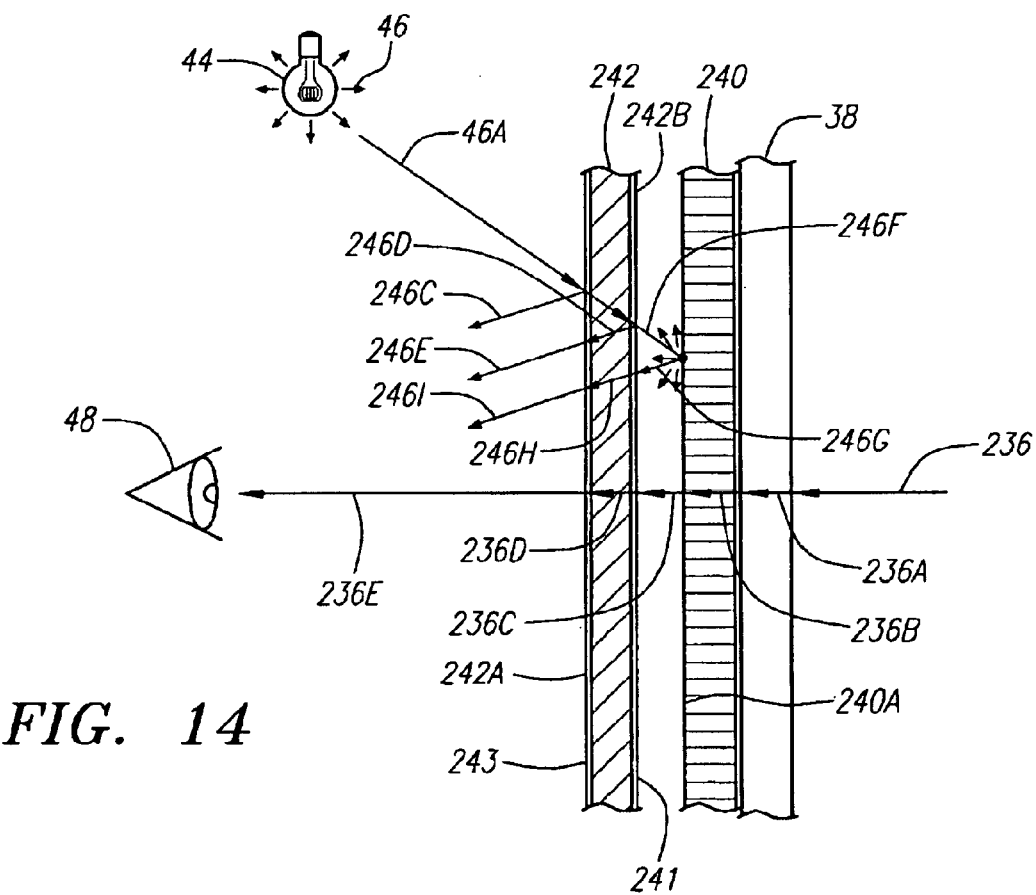
FIG. 14 is a detail of the projection television set of FIG. 12, showing representative rays of light that may be experienced by an observer watching the projection television set.

Turning to FIG. 14, the function of the projection television set 210 may be illustrated using an exemplary ray 236 that includes the combined light image emitted from the set of projection tubes, i.e., an image including red, green, and blue light from respective projection tubes. Because the red projection tube includes the color absorbing substance, the intensity of the red light in the ray 236 is reduced to about eighty two percent (82%) of the incident light produced by the red CRT, while the green and blue light remain at substantially one hundred percent (100%). The ray 236B passes through the lenticular screen 240, and the exiting ray 236C has its intensity reduced, independent of wavelength, further to about eighty percent (80%). Finally, the ray 236D passes through the protection panel 242, thereby further reducing its intensity to about seventy percent (70%) at the dominant wavelengths (and even further for the intermediate wavelengths). Thus, the ray 236E that reaches an observer 48 has an intensity of blue and green light that is about fifty six percent (56%) (1.00×0.80×0.70) of the intensity of the light generated by their respective CRT's, while the intensity of red light is about forty six percent (46%) (0.82×0.80×0.70).

Consequently, the observer 48 may experience increased green and blue color intensities that are about ten percent (10%) greater than the intensity of the red color. When the color temperature of the resulting images is adjusted to a predetermined color temperature, the current provided to the red CRT is increased, as compared to the green and blue CRT's, and may therefore reduce the risk of saturation of the blue CRT, as described above.

With respect to contrast, e.g., if a light source 44 generates an exemplary ray 46A that strikes the outside surface 242A of the protection panel 242, at least about ninety eight percent (98%) (0.99×0.99) of the ray 246B passes through the protection panel 242 and exits towards the lenticular screen 238, because of the anti-reflection films 241, 243. Consequently, the reflected rays 246C, 246E have an intensity less than one percent of the incident ray 246A. The reflected ray 246G, because it passes twice through the protection panel 242, which has a maximum transmittance of about seventy percent (7.0%) at any wavelength, has an intensity of less than fifty percent (50%) (0.70×. 0.70) of the incident ray 246A. Thus, the contrast may be substantially improved, and the impact on the resulting images substantially reduced compared to both a conventional non-tinted protection panel and a dark tint protection panel exposed to the same light source 44.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A rear projection television set, comprising:
   a cabinet having an opening in a front panel thereof communicating with a cavity therein;
   a set of projection tubes in the cavity for projecting images towards the opening, each projection tube configured for emitting substantially single color images of one of red, green, and blue light;
   a screen assembly mounted across the opening for viewing the images from outside the cabinet, the screen assembly comprising a protection panel having a spectral transmittance that peaks at wavelengths of substantially red, green, and blue light, and that is reduced substantially at wavelengths between red and green light and between green and blue light, wherein the protection panel is removable from the cabinet;
   a user interface for selecting one of an unshielded and a shielded mode indicating whether the protection panel is removed or mounted to the cabinet, respectively; and
   control circuitry coupled to the interface for adjusting current levels of the set of projection tubes in response to the selected mode to provide a predetermined color temperature of an image visible from outside the cabinet through the screen assembly.

2. The television set of claim 1, further comprising a mirror mounted in the cavity in a predetermined relationship to the set of projection tubes such that the images projected from the set of projection tubes are reflected towards the opening.

3. The television set of claim 1, wherein the lenticular screen has a spectral transmittance of at least about eighty percent.

4. The television set of claim 1, wherein the screen assembly further comprises a lenticular screen adjacent the protection panel.

5. The television set of claim 1, wherein the screen assembly further comprises a fresnel lens adjacent the protection panel.

6. The television set of claim 1, wherein the set of projection tubes comprises a CRT for emitting substantially red light, and a lens assembly for filtering the substantially red light emitted by CRT, the lens assembly having a spectral transmittance that substantially absorbs all light below a wavelength of about 600 nm and absorbs at least about ten percent of light at or above a wavelength of about 600 nm.

7. The television set of claim 1, wherein the protection panel has a spectral transmittance at a dominant wavelength of substantially red light that is at least about five percent less than at a dominant wavelength of substantially blue light.

8. The television set of claim 7, wherein the control circuitry is configured for increasing a color temperature of the set of projection panels when the shielded mode is selected.

9. The television set of claim 1, wherein the spectral transmittance of the protection panel at the dominant wavelengths of substantially red, green, and blue light is at least about sixty percent.

10. The television set of claim 1, wherein the spectral transmittance of the protection panel at a wavelength between red and green light is at least about five percent less than at the dominant wavelengths of substantially red and green light.

11. The television set of claim 1, wherein the spectral transmittance of the protection panel at a wavelength between green and blue light is at least about five percent less than at the dominant wavelengths of substantially green and blue light.

12. The television set of claim 1, wherein the spectral transmittance of the protection panel at a dominant wavelength of substantially red light is at least about five percent less than at a dominant wavelength of substantially blue light.

13. The television set of claim 1, wherein the protection panel comprises an anti-reflection film on at least one of its surfaces.

14. The protection panel of claim 1, further comprising a frame extending around a perimeter of the protection panel.

15. The protection panel of claim 1, wherein the frame comprises a connector for detachably mounting the protection panel to the projection television set.

16. A rear projection television set, comprising:
   a cabinet having an opening in a front panel thereof communicating with a cavity therein;
   a set of red, green, and blue projection tubes in the cavity for projecting images towards the opening, each projection tube configured for emitting substantially single color images in one of red, green, and blue light, respectively, the red projection tube comprising a lens assembly having a spectral transmittance of ninety percent or less;
   a screen assembly mounted across the opening for viewing the images from outside the cabinet, the screen assembly comprising:
      a lenticular screen having a spectral transmittance greater than about seventy percent; and
      a protection panel having a spectral transmittance that peaks at wavelengths of substantially red, green, and blue light, and that is reduced substantially at wavelengths between red and green light and between green and blue light, wherein the protection panel is removable from the cabinet;
   a user interface for selecting one of an unshielded and a shielded mode indicating whether the protection panel is removed or mounted to the cabinet, respectively; and
   control circuitry coupled to the interface for adjusting current levels of the set of projection tubes in response to the selected mode to provide a predetermined color temperature of an image visible from outside the cabinet through the screen assembly.

17. The television set of claim 16, wherein the spectral transmittance of the protection panel at a wavelength between red and green light is at least about five percent less than at the dominant wavelengths of substantially red and green light.

18. The television set of claim 16, wherein the spectral transmittance of the protection panel at a wavelength between green and blue light is at least about five percent less than at the dominant wavelengths of substantially green and blue light.

19. The television set of claim 16, wherein the protection panel comprises an anti-reflection film on at least one of its surfaces.

* * * * *

UNITED STATES PATENT AND TRADEMARK OFFICE
CERTIFICATE OF CORRECTION

PATENT NO.    : 6,717,626 B1
DATED         : April 6, 2004
INVENTOR(S)   : Taiji Kondo, Yuzo Nakano and Taketoshi Hibi It is certified that error appears in the above-identified patent and that said Letters Patent is hereby corrected as shown below:

<u>Column 13,</u>
Line 54, should read -- 3. The television set of claim 1, wherein the screen assembly further comprises a lenticular screen adjacent the protection panel. --
Line 57, should read -- 4. The television set of claim 3, wherein the lenticular screen has a spectral transmittance of at least about eighty percent. --

Signed and Sealed this

Eighth Day of February, 2005

JON W. DUDAS
*Director of the United States Patent and Trademark Office*